United States Patent
Kwon et al.

(10) Patent No.: US 6,352,643 B1
(45) Date of Patent: Mar. 5, 2002

(54) WASTEWATER TREATMENT PLANT COMPRISING UPFLOW ANAEROBIC REACTOR, AND WASTEWATER TREATMENT METHOD USING THEREOF

(76) Inventors: Joong-Chun Kwon, 221-110, Joongong Apt., Nae-dong, Seo-ku, Taejon-si 302-181; Hang-Sik Shin, D-2, Daedong Village, Koong-dong, Yusong-ku, Taejon-si 305-335; Byung-Uk Bae, 105-304, Boram Apt., Bub-dong, Taeduk-ku, Taejon-si 306-060; Kyu-Seon Yoo, 106-901, Chowon Apt., Mannyun-dong, Seo-ku, Taejon-si 302-150, all of (KR)

( * ) Notice: Subject to any disclaimer, the term of this patent is extended or adjusted under 35 U.S.C. 154(b) by 0 days.

(21) Appl. No.: 09/600,147
(22) PCT Filed: Nov. 10, 1999
(86) PCT No.: PCT/KR99/00676
§ 371 Date: Sep. 22, 2000
§ 102(e) Date: Sep. 22, 2000
(87) PCT Pub. No.: WO00/27763
PCT Pub. Date: May 18, 2000

(30) Foreign Application Priority Data

Nov. 11, 1998 (KR) .............................. 98-48263

(51) Int. Cl.[7] .......................... C02F 3/30; B01D 21/06
(52) U.S. Cl. ................ 210/605; 210/623; 210/629; 210/630; 210/195.3; 210/197; 210/221.2; 210/259; 210/528
(58) Field of Search ................ 210/605, 621, 210/623, 626, 629, 630, 195.1, 195.3, 197, 202, 220, 221.2, 252, 258, 259, 523, 528, 534, 903, 906

(56) References Cited

U.S. PATENT DOCUMENTS

| | | | | |
|---|---|---|---|---|
| 4,070,277 A | * | 1/1978 | Uban et al. |
| 4,076,515 A | * | 2/1978 | Rickard |
| 4,765,891 A | * | 8/1988 | Wyness |
| 4,919,815 A | * | 4/1990 | Copa et al. |
| 5,599,450 A | | 2/1997 | Li et al. |
| 5,954,963 A | * | 9/1999 | Matheson |

FOREIGN PATENT DOCUMENTS

| DE | 3327775 A1 | 2/1985 |
|---|---|---|
| EP | 0382340 A1 | 8/1990 |
| WO | WO 87/05593 A1 | 9/1987 |

* cited by examiner

Primary Examiner—David A. Simmons
Assistant Examiner—Fred Prince
(74) Attorney, Agent, or Firm—Lahive & Cockfield, LLP

(57) ABSTRACT

The present invention provides a method and system for the treatment of wastewater. One embodiment includes an anaerobic reactor and aerobic reactor. A terminal settling tank includes an upflow anaerobic reactor comprising an inlet mounted at the external lowest region of the anaerobic reactor. An introducing mechanism is directly connected to the inlet and located at the lower region in the anaerobic reactor and has a perforated drain pipe therein. A mixer is provided at the main shaft. A discharge is provided for allowing reaction water, which contains some portion of sludge generate by the mixer, to flow into the aerobic reactor. A sludge-accumulator is provided for collecting the sludge, which is settled by gravity during the reaction and produced by the mixer, to the center of the anaerobic reactor.

5 Claims, 8 Drawing Sheets

WASTEWATER TREATMENT PLANT COMPRISING UPFLOW ANAEROBIC REACTOR, AND WASTEWATER TREATMENT METHOD USING THEREOF

TECHNICAL FILED

Be present invention relates to a wastewater treatment plant comprising an upflow anaerobic reactor and to a wastewater treatment method using thereof. More specifically, the present invention relates to a wastewater treatment plant which comprises the facultative bacteria and an anaerobic reactor, and also relates to a method for wastewater treatment using thereof. By using the present invention, the organic wastewater containing non-biodegradable and toxic matter, nutrients (N, P), and heavy metals can be treated in a stable manner; the sludge treatment cost can be reduced by keeping a high concentration of sludge; and the land usage for the facilities, the costs for construction and operation can be much saved by using the preinstalled settling tank as a reactor.

BACKGROUND ART

Generally, a wastewater contains nutrients such as nitrogen or phosphor, non-biodegradable and toxic matter, and heavy metals. The treatment methods for clarifying such wastewater can be generally classified into the biological method or treatment of the wastewater containing organic compounds, and the physicochemical method for treatment of the wastewater having non-biodegradable and toxic matter and heavy metals therein.

To repeat, for removal of organic matters, the biological method is in the most common use among the above treatment methods. As a representative of the biological treatments, there is an activated sludge method that employs a treatment plant consisting of an initial settling tank, an aeration tank, and a terminal-settling tank. In this case, however, a thickening tank is indispensably required for the post-treatment process of the sludge since the sludge concentration in the settling tank is as low as 5000~15000 mg/L, and further, the efficiency decline is inevitably invited in the terminal settling tank if under the low concentration of the sludge, for the aeration tank is run with 1500~3000 mg/L of the sludge concentration during the operation. Moreover, in the activated sludge method, there has often been the sludge-bulking phenomenon by the variation of quality and amount of the influent water, with the result of process failure or water quality deterioration.

Another biological method for releasing nitrogen or phosphor is one employing the anaerobic•aerobic method, in which an aerobic reactor provided with oxygen thereinto and an anaerobic reactor without the supply of oxygen are arranged in a row for operation in the conventional activated sludge method, and thereby, nitrogen and phosphor can be removed by means of the action of the microorganisms. However, since this method employs a complete-mixing type of reactor, it is difficult to retain high concentration of the microorganisms in the reactor and a complete anaerobic atmosphere can hardly be kept during denitration or in the guidance of phosphor effluence. Such points as these have often served as restrictions in designing a reactor and brought about the problem of complicated operation.

In order to treat the wastewater containing non-biodegradable and toxic matter and heavy metals, it is common to employ a biological method added to the physicochemical treatment method. However, such physicochemical methods suffer from a drawback in that the operation cost is increased due to the great amount of consumption of the chemicals for adsorption or oxidation. Further, the biological treatment associated with these physicochemical methods, in terms of practical use, is in its early stage; a secondary treatment is indispensably required for elimination of the intermediate products of heavy toxicity which are produced during the initial treatment process; the operation cost is inevitably increased in the anaerobic treatment because of the necessity of temperature retention.

To sum up, the organic wastewater containing heavy metals has been clarified by using the physicochemical treatment method in the main, but in recent years, a biological treatment method using the sulfate-reducing bacteria has newly been on the rise. In this method, however, there is a defect that the operation cost is increased due to the temperature retention, since the sulfate-reducing bacteria, on account of its nature, must be grown in a rigorous anaerobic atmosphere.

In conclusion, a more efficient and economic method for treatment of wastewater has been wanted, in which such problems as inherent to the conventional physicochemical and biological methods for treatment of the organic wastewater containing non-biodegradable and toxic matter, nutrients such as nitrogen or phosphor, and heavy metals, viz., the problems in that the cost for treatment is unduly increased, the degree of clarification has not reached completion as yet, and a secondary treatment is necessary due to the production of intermediate products, can all be remedied.

The inventors of the present invention have unceasingly endeavored with studying and doing a lot of research for solving the problems of the prior art, to finally confirm that by using the wastewater treatment plant which comprises an upflow anaerobic reactor having the improved introducing means and discharging means, and combined with the conventional aerobic reactor and settling tank, the organic wastewater containing non-biodegradable and toxic matter, nutrients such as nitrogen or phosphor, and heavy metals can successfully be treated, resulting in a greatly improved clarification efficiency. To this end, the inventors have finally accomplished the present invention.

Ultimately, it is the main object of the present invention to provide a wastewater treatment plant comprising an upflow anaerobic reactor.

Another object of the present invention is providing of a wastewater treatment method using said wastewater treatment plant.

SUMMARY OF THE INVENTION

Below, the configuration of the wastewater treatment plant comprising an upflow anaerobic reactor according to the present invention is described in more detail.

With respect to the wastewater treatment plant consisting of an anaerobic reactor, an aerobic reactor, and a terminal settling tank, the present invention is characterized in that said anaerobic reactor comprises an inlet mounted at the external lowest region of the anaerobic reactor; an introducing means which is directly connected to said inlet but is located inside of the anaerobic reactor at the lower part, and has a perforated drain pipe therein; the mixing means which is installed at the main shaft thereof at a regular interval in the anaerobic reactor; a discharging means which has the radial-shaped weirs extending outwards from the center and is provided at the upper region in the anaerobic reactor for allowing the reaction water which comes to contain some portion of the sludge in the reaction generated by said mixing means, to flow into the aerobic reactor, a sludge-accumulating means which is situated at the lower region in the anaerobic reactor and collects the sludge at the center in the anaerobic reactor, said sludge being settled by the gravity force during said reaction by the mixing means.

As one embodiment of the present invention, a wastewater treatment plant employing the upflow anaerobic reactor according to the present invention is described hereinbelow with reference to FIG. 1a.

First of all, as aforementioned, the upflow anaerobic reactor (10) comprises an inlet (11), an introducing means (12), a discharging means (13), a mixing means (14), and a sludge-accumulating means (15).

Of these constituents, the inlet (11) is installed at the external lowest region of the anaerobic reactor (10) in order to introduce both the influent water and the sludge into the anaerobic reactor (10), said sludge having been returned from the terminal settling tank (30) by the actuation force of the sludge-returning pump (50). Such inlet (11) is integrated into a single channel before the introducing means (12) in order for the influent water to be mixed with the return sludge prior to flowing into the anaerobic reactor.

Next, the introducing means (12), directly connected to said inlet (11), is positioned at the lower region in the anaerobic reactor (10), to allow the influent water or the return sludge passing through said inlet (11) to be introduced into the lower region in the anaerobic reactor (10). The introducing means (12) is shaped as a perforated drain pipe (a pipe having perforations thereon) for prevention of the clogging by sludge (ref.: FIGS. 2a~2c), and is preferably made of stainless steel.

The discharging means (13) is positioned at the upper region in the anaerobic reactor (10) and is designed so that the reaction water which contains some portion of the sufficiently grown sludge by the aid of the mixing means (to be described below) can flow into the aerobic reactor (20). Different from the conventional one, the discharging means (13) of the present invention has such a configuration in that the weirs are installed in a radial manner with being extended outwardly from the center, for the purposes of the prevention of clogging by the sludge and the uniform discharge of the effluent water (ref.: FIGS. 3a~3c). This discharging means (13) is designed in such a manner to evenly collect and discharge the reaction water containing the return sludge mixed in the influent water. And, it is made of an ordinary steel plate.

Next, three to six pieces of the mixing means (14) are installed at the main shaft (17) in the anaerobic reactor (10) at a regular interval of about 50 cm~1 m, to prevent the sludge channeling and mix the reaction water in a continuous manner, thereby allowing the active fermentation reaction by the microorganisms to be carried out in the anaerobic atmosphere. In this way, the organic wastewater containing non-biodegradable and toxic matter and nutrients (N, P) is efficiently purified in the anaerobic reactor (10). The sludge which is settled during the reaction generated by said mixing means (14) is collected at the lower center in the anaerobic reactor (10) through the sludge-accumulating means (15), and then discharged outside the reactor by the actuation force of the sludge-discharging pump (40).

Another embodiment of the present invention comprises a wastewater treatment plant employing the anaerobic reactor in which the introducing means (12') for the influent water and that (12") for the return sludge are separately provided. The description thereof is given below with reference to FIG. 1b.

In the second embodiment of the present invention, the inlet (11') for introduction of the influent water is separated from the other inlet (11") for introduction of the return sludge. Correspondingly, the inflow water-introducing-means (12') is installed at the lowest region in the upflow anaerobic reactor (10), while the return sludge-introducing-means (12") which is used for removing the organic matters and nutrition salts contained in the influent water is installed straight over the inflow water-introducing-means (12') in the upflow anaerobic reactor (10). These means are constructed of a perforated drain pipe, which can prevent clogging, by the sludge. Further, the upflow anaerobic reactor (10) of the second embodiment according to the present invention also comprises a discharging means (13), a mixing means (14), a sludge-accumulating means (15), etc., as illustrated in FIG. 1a.

Another embodiment according to the present invention comprises a wastewater treatment plant employing an additional upflow anaerobic reactor 10'), which is installed in a row in the wastewater treatment plant of the second embodiment of FIG. 1b. A detailed description is given below referring to FIG. 1c.

In the third embodiment according to the present invention, an additional upflow anaerobic reactor (10') is employed, which is installed in a row in the wastewater treatment plant of the second embodiment of FIG. 1b. In the additional upflow anaerobic reactor (10'), in order to mix the return sludge which is returned from the aerobic reactor (20) via the internal return pump (60), with the reaction water which is discharged from the upflow anaerobic reactor (10) and contains some portion of the sludge, an inlet (11''') is provided at the external lowest region of the upflow anaerobic reactor (10'). Further, an introducing means (12''') is provided at the lower region in the anaerobic reactor (10') and connected to said inlet (11''') by means of the flanges, thereby allowing both the effluent which is discharged from the anaerobic reactor (10) and passed through the inlet (11'''), and the return sludge which is returned by the actuation force of the internal return pump (60) and passed through the inlet (11'''), to be introduced into the lower region in the anaerobic reactor (10'). Such introducing means (12''') is constructed of a perforated drain pipe for prevention of clogging by the sludge (ref.: FIGS. 2a~2c). Further, the additional anaerobic reactor (10') also comprises a discharging means (13') and a mixing means (14'). Said discharging means (13') is situated at the upper region in the anaerobic reactor (10') for discharging the reaction water containing some portion of the sludge which is sufficiently matured by the mixing means (14') (this mixing means (14') to be described from below) into the aerobic reactor (20). Further, said discharging means (13') has the radial-shaped weirs extending outwards from the center, for the purpose of preventing clogging by the sludge and allowing the effluent water to be uniformly discharged. As to the mixing means (14'), three to six pieces of the nixing means (14') are installed at the main shaft (17') thereof at a regular interval of about 50 cm~1 m in the anaerobic reactor (10'), to prevent the sludge channeling and to mix the reaction water continuously, thereby effecting the active fermentation of the microorganisms in the anaerobic atmosphere. In this way, the organic wastewater containing nutrients (N, P) is efficiently clarified in the anaerobic reactor (10').

The wastewater treatment plants in all embodiments as described above comprise an aerobic reactor (20) and a terminal settling tank (30) in addition to said anaerobic reactor (10). The aerobic reactor (20) used herein has an oxygen-generating means, namely, a diffuser (21) at its lower region, for attempting to supply sufficient amount of oxygen for the facultative fermenting bacteria in order for them to exhibit a high activity. In this regard, any aerobic reactor (20) of such material and construction as commonly used in the art may be suitable for use in the present invention. The terminal settling tank (30) is used for removing the sludge which has been effectively degraded by the facultative bacteria present in the reaction water in said aerobic reactor (20). For this, a gravity settling tank is preferred in which the sludge is slowly removed by the gravity force in clarifying the wastewater for obtainment of purified water. In addition, however, such a settling tank as equipped with a scum baffle can also be used for the present invention. The sludge precipitated in the settling tank is collected by the sludge-accumulating means (15), then returned to the inlet (11) at the external lowest region of the anaerobic reactor (10) by the sludge-returning pump (50), and finally separated and discharged in the state of sludge by the sludge-discharging pump (40) in said anaerobic reactor (10). Further, an actuating means (16, 16') is mounted at the upper end of the main shaft (17, 17') in the anaerobic reactor (10, 10'), to provide the actuation force for running the mixing means (14, 14') connected to the main shaft in the anaerobic reactor.

As described hereinbefore, the wastewater treatment plant according to the present invention has such an advantageous point in that the organic wastewater containing non-biodegradable and toxic matter and nutrients (N, P) can be treated more efficiently than in the conventional wastewater treatment plants, by virtue of using the facultative bacteria and an upflow anaerobic reactor.

Below, the wastewater treatment method which employs the wastewater treatment plant comprising the upflow anaerobic reactor according to the present invention is described in more detail by stages as well as the function and effect of said wastewater treatment plant.

Step 1
Introduction of Influent Water into the Anaerobic Reactor

The influent water which is an organic wastewater containing non-biodegradable and toxic matter, nutrients (N, P) or the like is firstly guided into the anaerobic reactor (10) through the inlet (11, 11') provided at the external lowest region of the anaerobic reactor (10), and then, said influent water is introduced into the anaerobic reactor (10) through the introducing means (12, 12') which is connected to the inlet (11, 11') inside the anaerobic reactor (10).

Step 2
Fermentation in the Anaerobic Reactor

The activated sludge is introduced into the anaerobic reactor (10) through said inlet (11, 11") and introducing means (12, 12') for the purpose of clarifying the influent water which contains non-biodegradable and toxic matter and nutrients (N, P) and is introduced into the anaerobic reactor (10) as described in Step 1, in an even more efficient fashion. Next, the mixing means (14) mounted at the main shaft in the reactor is run continuously at the rat e of 3~20 rpm for generation of full fermentation. Here, in order to more efficiently clarify the organic wastewater containing non-biodegradable and toxic matter, nutrients such as nitrogen or phosphor, and heavy metals, a secondary fermentation process may further be included. To elaborate, the reaction water is firstly fermented selectively in said anaerobic reactor (10), and is then aerated in the aeration tank (20). Meanwhile, the return sludge containing some part of such sludge as discharged from the aerobic reactor (20) after the above aeration process and recycled through the internal return pump (60) is introduced into the other anaerobic reactor (10') through the inlet (11''') and the introducing means (12'''). Then, the secondary fermentation is carried out by continuously running the mixing means (14') with a rate of 3~20 rpm for preventing the channeling of the sludge which is apt to flow upwards. Such rate of mixing can prevent the channeling phenomenon of the influent admixture, which is caused due to the high concentration of the sludge when the admixture of the sludge and the organic wastewater uprises in the anaerobic reactor (10, 10') during said reaction process. If the mixing rate of said mixing means (14, 14') is less than 3 rpm, the reaction is rendered not sufficient due to the occurrence of the channeling phenomenon. It is also undesirable that the mixing rate is more than 20 rpm, for the complete mixing occurs in such a case, with the result of incapability of taking advantage of the plug-flow type reactor.

Step 3
Influence into the Aerobic Reactor

Some portion of the sludge which is settled during the above process is collected by the sludge-accumulating means (15) positioned at the lower center in the anaerobic reactor (10), and then discharged by the actuation force of the sludge-discharging pump (40). The reaction water containing some portion of the sludge which is flowing upwards is discharge from the anaerobic reactor (10, 10') and introduce into the aerobic reactor (20) via the discharging means (13, 13') situated at the upper region in the anaerobic reactor (10, 10').

Step 4
Aeration in the Aerobic Reactor

The reaction water containing some portion of the sludge, which was discharged from the anaerobic reactor (10, 10') in the prior process, is provided with a sufficient amount of oxygen through a diffuser (21). As such, the activities of the aerobic bacteria or the facultative bacteria present in the sludge are increased so that the various organic matters in the wastewater are decomposed through oxidation to inorganic matters such as $H_2O$, $CO_2$, etch, the ammonia nitrogen and organic nitrogen are degraded into the nitrate nitrogen, and the sludge comes to ingest excess phosphor.

Step 5
Separation of Purified Water and Return of Sludge

The reaction water partially purified by the above aeration process is transferred into the terminal settling tank (30) for obtaining purified water separately. The sludge settled by the gravity force is collected by the sludge-accumulating means (15') situated at the lower center in the terminal settling tank (30). Afterwards, the collected sludge is returned to the inlet (11, 11") positioned at the external lowest region of the anaerobic reactor (10) by the actuation force of the sludge-returning pump (50), and finally discharged to the outside from the anaerobic reactor (10) by the actuation force of the sludge-discharging pump (40) by way of a weight-reducing means such as sludge digester or dewatering means.

In the above wastewater treatment method according to the present invention, suitable microorganisms for use in the anaerobic reactor (10, 10') or the aerobic reactor (20) may include Nitrosomonas, Nitrobacter, Denitrifier, Sulfate-reducing bacteria, Pseudomonas, Achromobacter, Aerhorbacter, Micrococcus, Bacillus, Proteus, Flovobacterium, Acinetobacter, Corynebacterium, Mycobacterium, or the like. In addition to these microorganisms, a variety of facultative bacteria, which are commercially available, can be used in the present invention depending on the target organic matter.

DESCRIPTION OF ILLUSTRATED EMBODIMENTS

The present invention will be described in further detail on the basis of the examples of embodiment given below. Since the examples of embodiment are nothing but for explanation of the advantageous effect of the present invention, it will become apparent to those of ordinary knowledge in the art that the scope of the present invention is never limited to these examples of embodiment in accordance with the gist of the present invention.

Example 1
Clarification of Organic Matter of High Concentration

Figure 1A:
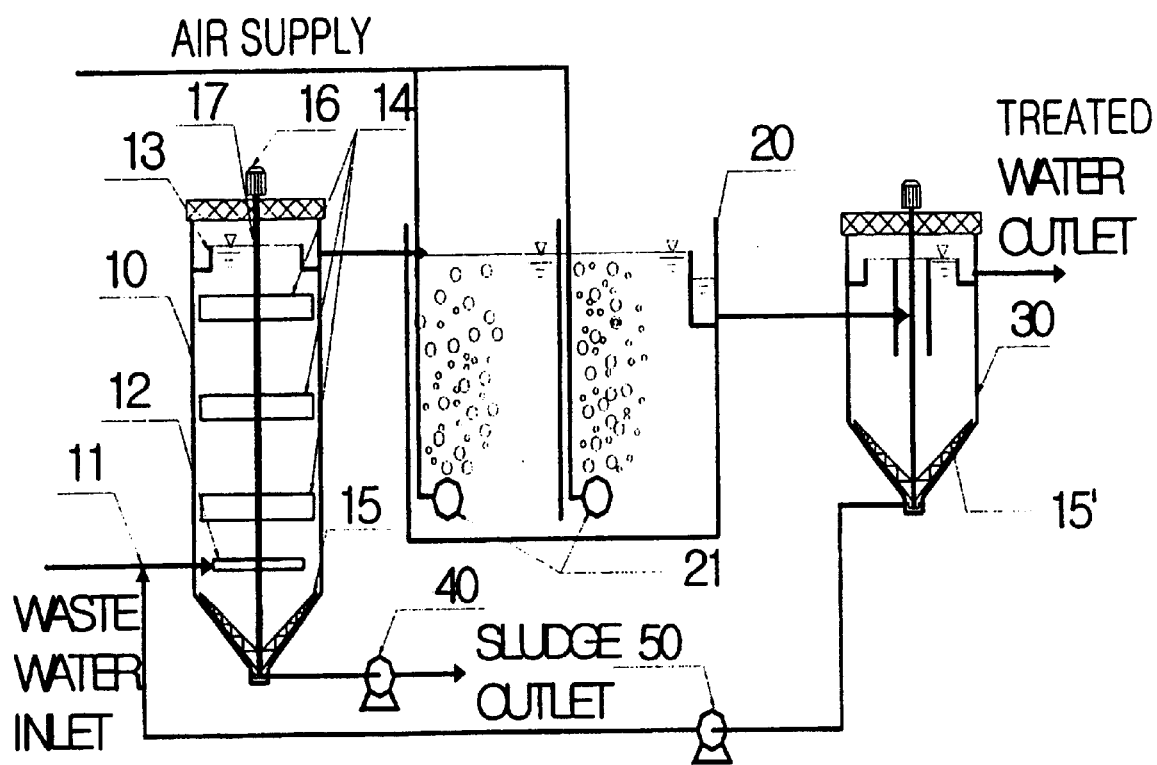
FIG. 1a is a schematic diagram illustrating another embodiment of the wastewater treatment plant which employs the upflow anaerobic reactor according to the present invention.
Figure 1B:
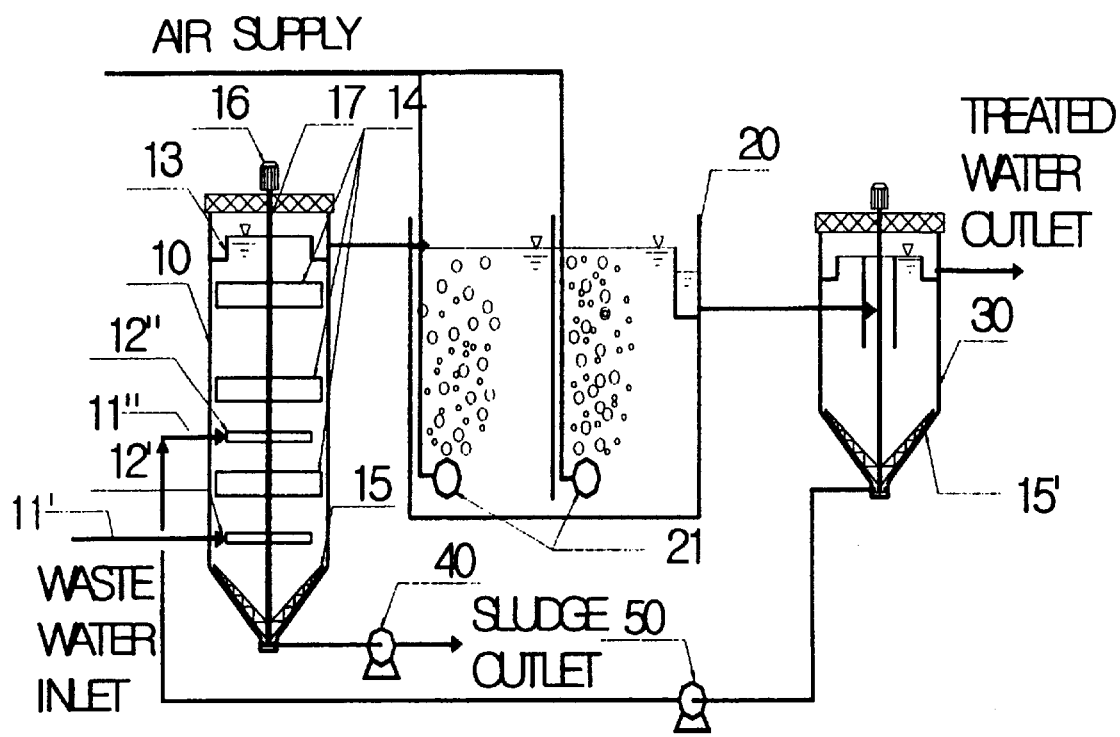
FIG. 1b is a schematic diagram illustrating another embodiment of the wastewater treatment plant which employs the upflow anaerobic reactor according to the present invention.
Figure 1C:
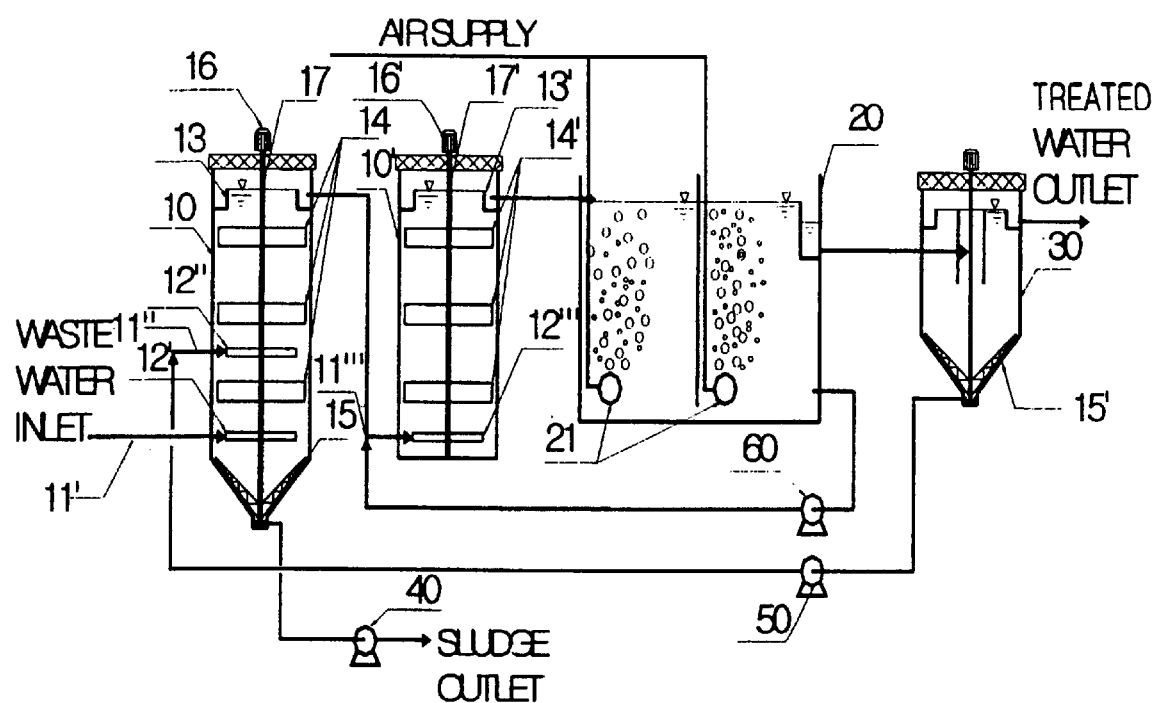
FIG. 1c is a schematic diagram illustrating a third embodiment of the wastewater treatment plant which employs the upflow anaerobic reactor according to the present invention.
Figure 2A:
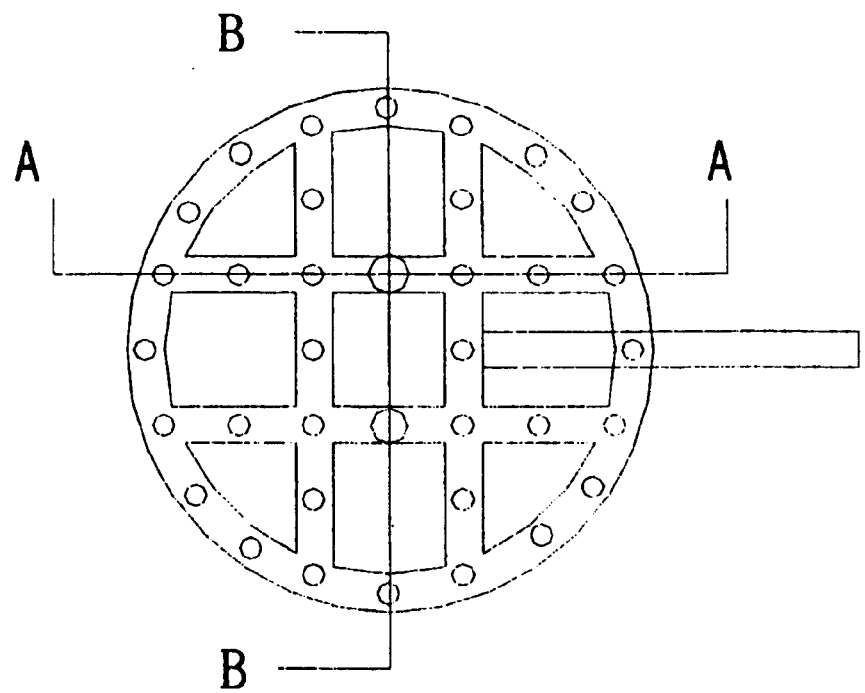
FIG. 2a is a schematic plane view of an introducing means in the anaerobic reactor according to the present invention.
Figure 2B:
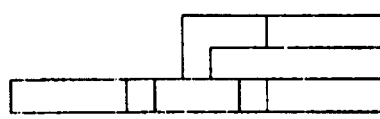
FIG. 2b is a cross-sectional view of the introducing means shown in FIG. 2a along the line A—A.
Figure 2C:
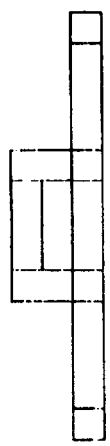
FIG. 2c is a cross-sectional view of the introducing means shown in FIG. 2a along the line B–B.
Figure 3A:
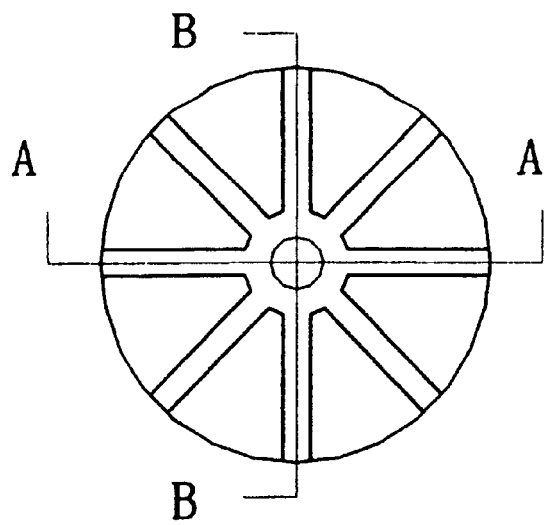
FIG. 3a is a schematic plane view of a discharging means in the anaerobic reactor according to the present invention.
Figure 3B:
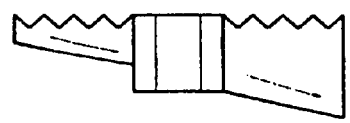
FIG. 3b is a cross-sectional view of the discharging means shown in FIG. 3a along the line A—A.
Figure 3C:
FIG. 3c is a cross-sectional view of the discharging means shown in FIG. 3a along the line B—B.
Figures 4, 5:
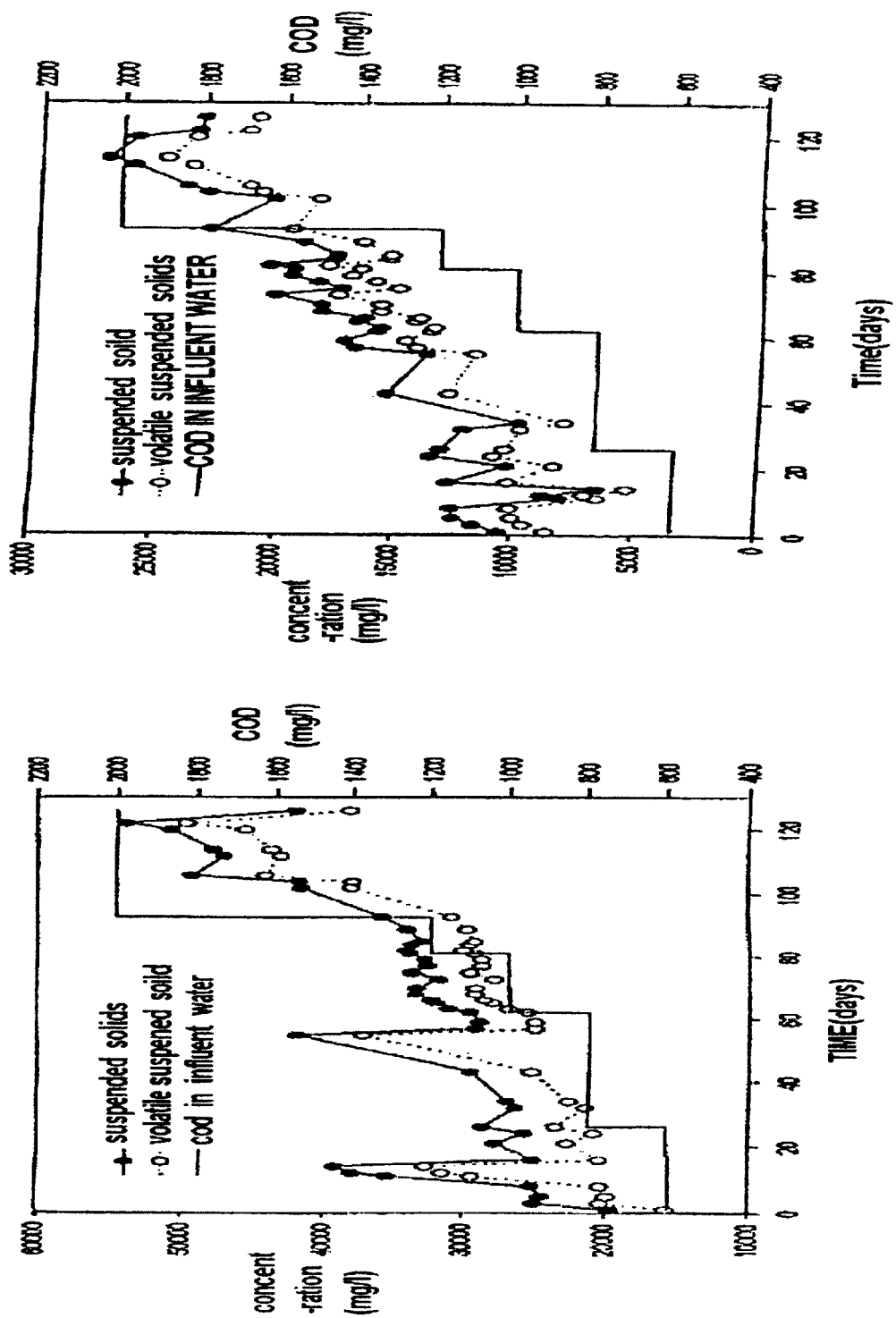
FIG. 4 is a graph showing the changes of COD concentration in the influent water and of the sludge concentration (suspended solids and volatile suspended solids) in the anaerobic reactor, plotted with the increase of organic matters in the water source.
FIG. 5 is a graph showing the changes of COD concentration in the influent water and of the sludge concentration (suspended solids and volatile suspended solids) in the aerobic reactor, plotted with the increase of organic matters in the water source.
Figure 7:
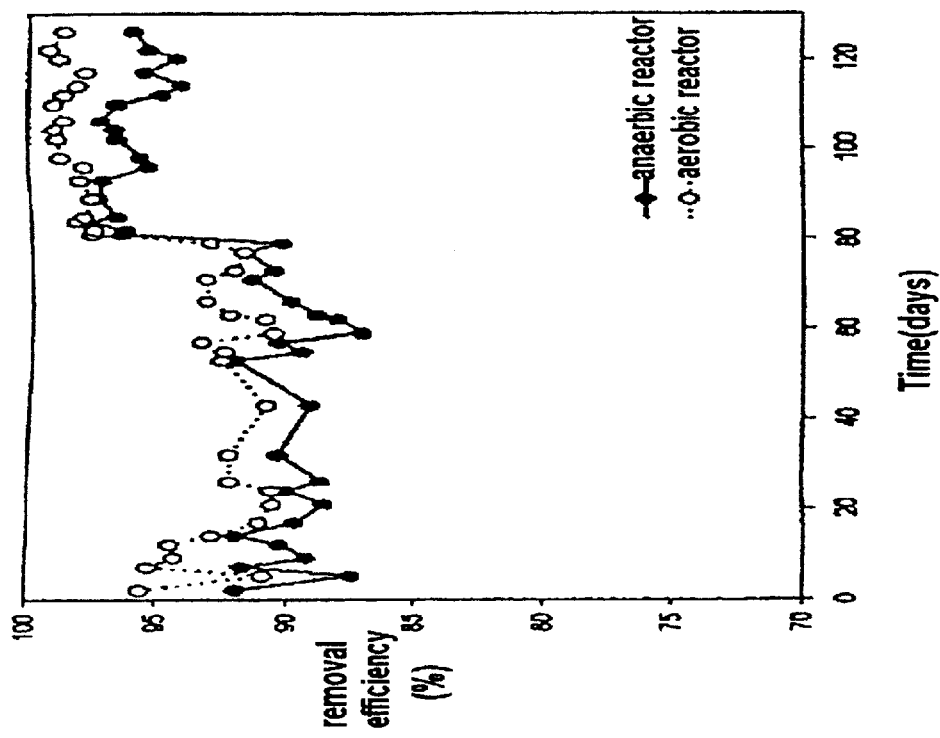
FIG. 7 is a graph showing the changes of the COD removal efficiency in the anaerobic reactor and in the aerobic reactor, respectively, plotted with the increase of organic matters in the water source.
Figure 6:
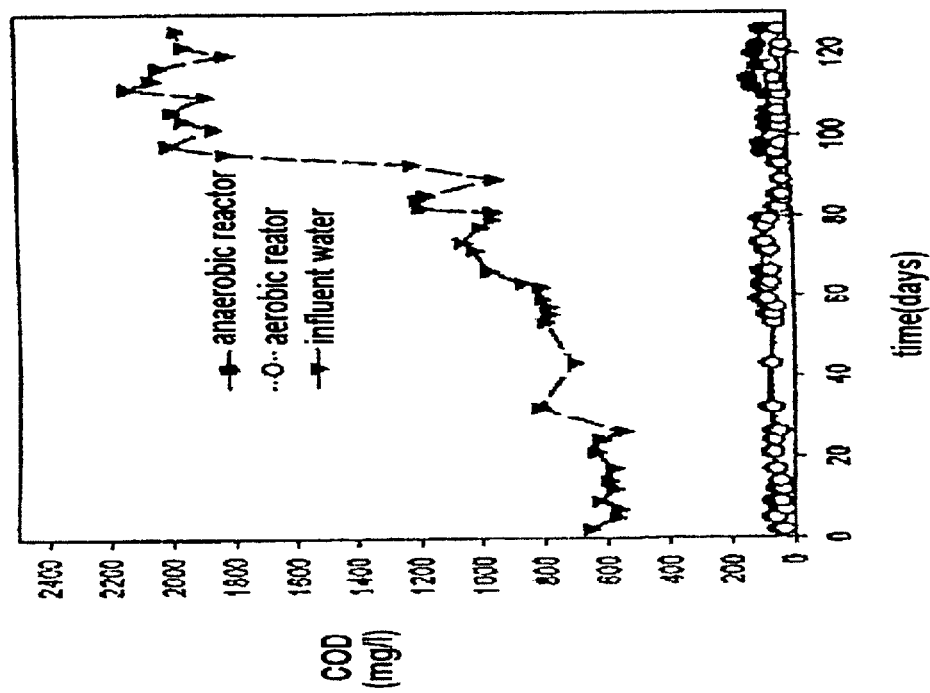
FIG. 6 is a graph showing the changes of COD concentrations in the influent water and in each of the reaction water discharged from the anaerobic reactor and the aerobic reactor, respectively, plotted with the increase of organic matters in the water source.

The retention time of the organic matter of high concentration was governed to be 15 hours in the whole reactors (anaerobic reactor: 7 hours, aerobic reactor: 8 hours), and the concentration of the organic matter was made to change from 600 mg/L to 2000 mg/L. With these conditions, the clarification process was carried out by using the wastewater treatment plant comprising the upflow anaerobic reactor according to the present invention. As a result, the concentration of the sludge (suspended solids and volatile suspended solids) in the anaerobic reactor had been kept within the range of from 25000 mg/L to 55000 mg/L, which concentration made it possible that the anaerobic reactor could serve as a thickening tank (ref.: FIG. 4). The concentration of the sludge (suspended solids and volatile suspended solids) in the aerobic reactor had changed within the range of 10000 mg/L~25000 mg/L according as the COD concentration of the influent water was changed from 600 mg/L to 2000 mg/L. That is, the concentration of the sludge in the present invention was kept more than 6~8 times as high as that in the typical activated sludge method, viz., 1500 mg/L~3000 mg/L (ref.: FIG. 5). To this end, the bulk size of the reactor could be reduced in treating the organic matter of high concentration according to the method of the present invention since the greater amount of the sludge could be retained over the process when compared with the typical activated sludge process. Further, if the concentration of the organic matter is increased, the sludge bulking befalls in the typical activated sludge process, to which the process failure is attributed, whereas, in the present invention, even in the case where the COD concentration of the influent water was increased to 2000 mg/L, the COD concentration in the anaerobic reactor was kept below 100 mg/L and the removal efficiency exhibited 85~9% in the anaerobic reactor, and further, the COD concentration of the effluent water from the aerobic reactor was also kept below 100 mg/L to exhibit more than 98% of removal efficiency in the aerobic reactor (ref.: FIGS. 6 and 7). Consequently, with the empirical confirmation of the fact that the wastewater containing organic matter of high concentration could stably be treated, it has been found that the present invention could also be applied to treatment of organic wastewater of high concentration.

Example 2
Clarification of Wastewater Containing Trichlorophenol

Figure 8:
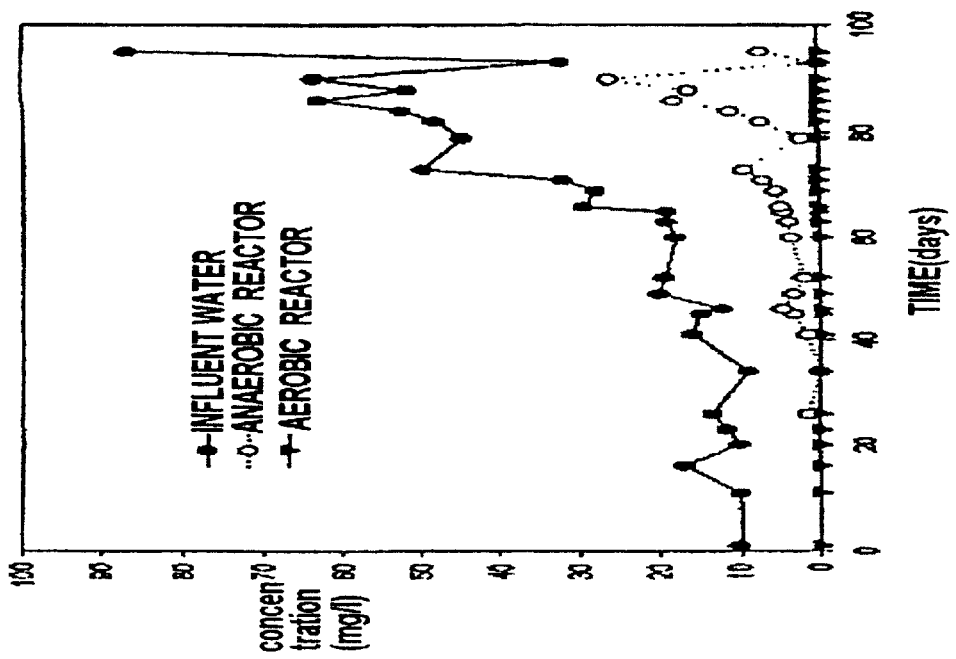
FIG. 8 is a graph showing the changes of the concentrations of trichlorophenol in the influent water and in each of the effluent water discharged from the anaerobic reactor and the aerobic reactor, respectively.

The commonly known chlorinated compound, viz., trichlorophenol (hereinafter referred to as 'TCP') was used in the present Example as a toxic and non-biodegradable matter. Generally, the chlorinated compound is known difficult to degrade using a biological treatment due to its inherent toxicity and non-degradability. With increasing such toxic matter TCP to 60 mg/L starting with 10 mg/L, the wastewater was clarified by the anaerobic•aerobic method employing the upflow anaerobic reactor inoculated with the facultative bacteria according to the present invention. The result thereof, as can be seen in FIG. 8, was not only that the intermediate products, which were typical of the general anaerobic treatment, were not generated during the process in which TCP was removed while passing through the upflow anaerobic reactor, but also was no intermediate product produced in the effluent water from the aerobic reactor.

Example 3
Clarification of Wastewater Containing Sulfate

Figure 9:
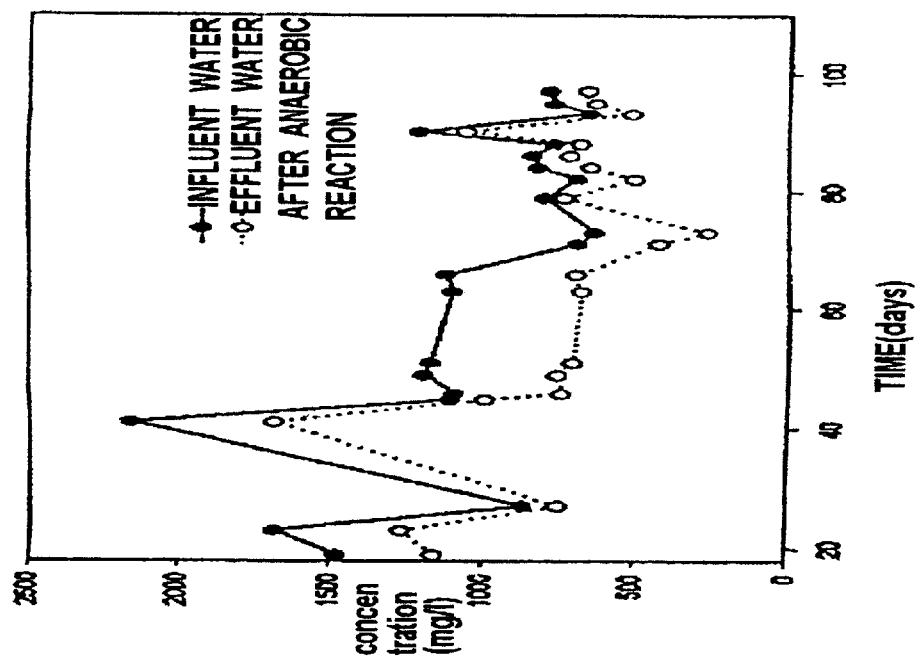
FIG. 9 is a graph showing the concentrations of sulfate which is influent into and effluent from the anaerobic reactor, respectively.

600~2400 mg/L of sulfate was fed into the wastewater treatment plant comprising the upflow anaerobic reactor inoculated with the facultative bacteria according to the present invention. Then, the clarification process was carried out over the period of about 100 days with 20 times of measurement of the concentration of the influent liquor and that of the effluent liquor which was from the anaerobic reactor. As a consequence, as illustrated in FIG. 9, the sulfate removal efficiency in the anaerobic reactor was found to be 30~60%. This proves that it is feasible that the heavy metals are removed in the state of sulfate after combination with sulfides.

INDUSTRIAL APPLICABILITY

As particularly described and proved in the above, the present invention provides a wastewater treatment plant comprising an upflow anaerobic reactor and a wastewater treatment method using thereof With the use of the wastewater treatment plant comprising the upflow anaerobic reactor of the present invention, an organic wastewater containing non-biodegradable and toxic matter, nutrients such as nitrogen or phosphor, and heavy metals can be biologically treated. Further, the bulk size of the reactor can be reduced by keeping a high concentration of the sludge in the reactor, with the result of achievement of the economic treatment of the wastewater. In particular, the present invention can afford to exclude the need of a thickening tank in the case of a sewage treatment plant thanks to the high concentration of the sludge in the upflow anaerobic reactor, and further, the initial settling tank can also serve as a reactor, thereby achieving the additional benefits of reduced land usage and reduced costs for construction and operation.

We claim:

1. A wastewater treatment plant comprising, an upflow anaerobic reactor, an aerobic reactor, and a terminal settling tank, wherein said upflow anaerobic reactor includes an inlet mounted at an external lowest region of the anaerobic reactor; an introducing means directly connected to said inlet and located at a lower region in the anaerobic reactor, and having a perforated drain pipe therein; mixing means which is provided at a main shaft thereof at a regular interval in the anaerobic reactor; a discharging means having radial-shaped weirs extending outwards from a center and is positioned at an upper region in the anaerobic reactor for allowing reaction water containing sludge from a reaction generated by said mixing means to flow into the aerobic reactor; a sludge-accumulating means which is provided at the lower region in the anaerobic reactor for collecting the sludge which is settled by gravity during said reaction by the mixing means to the center of the anaerobic reactor.

2. The wastewater treatment plant according to claim 1, wherein said inlet is separated into an influent water-guiding inlet and a return sludge-guiding-inlet, and said introducing means is separated into an influent water-introducing-means and a return sludge-introducing-means.

3. The wastewater treatment plant according to claim 1, further comprising a second upflow anaerobic reactor having an inlet provided at the external lowest region of the upflow anaerobic reactor for allowing both the reaction water which is discharged from said anaerobic reactor and contains some portion of the sludge, and the return sludge which is returned from the anaerobic reactor by an internal return pump after the aeration process therein, to be mixed together and then flow into the lower region in the second upflow anaerobic reactor; an introducing means provided at a lower region in the second upflow anaerobic reactor and directly connected to said inlet, and having a perforated drain pipe therein; a mixing means which is installed at a main shaft at a regular interval in the second anaerobic reactor; a discharging means which has radial-shaped weirs extending outwards from a center and is provided at the upper region in the second anaerobic reactor for discharging the reaction water containing some portion of the sludge into the aerobic reactor.

4. A method for treating wastewater with a wastewater treatment plant having an upflow anaerobic reactor according to claim 1, comprising the steps of:

(i) introducing the influent water into the anaerobic reactor through the introducing means directly connected to the inlet, after guiding said influent water into the anaerobic reactor through the inlet provided at the external lowest region of the anaerobic reactor;

(ii) carrying out the fermentation reaction by continuously running the mixing means at the rate of 3~20 rpm for preventing a channeling phenomenon of the sludge tending to flow upwards, after introducing the activated sludge into the anaerobic reactor through the inlet and the introducing means;

(iii) discharging the sludge settled in said anaerobic reactor through the sludge-accumulating means provided at the lowest center in the anaerobic reactor, while discharging the upflow reaction water containing some portion of the sludge into the aerobic reactor from the anaerobic reactor through the discharging means provided at the upper region in the anaerobic reactor;

(iv) aerating the reaction water which is discharged into the aerobic reactor in the prior process and contains some portion of the sludge, with a sufficient amount of oxygen by using a diffuser; and (v) transferring the reaction water to the terminal settling tank after the above aeration process, obtaining the purified water separately, and returning the sludge settled by the gravity force to the inlet provided at the external lowest region of the anaerobic reactor by using the actuation force of the sludge-returning pump after collecting said settled sludge in the sludge-accumulating means provided at the lowest center in the terminal settling tank.

5. The wastewater treatment method according to claim 4, comprising the steps of:

(i) introducing both the reaction water which is transferred from the anaerobic reactor and contains some portion of the sludge, and the return sludge which contains some portion of such sludge as is recycled through the internal return pump after the aeration process in said aerobic reactor, into the additional anaerobic reactor through the inlet and the introducing means;

(ii) carrying out the secondary fermentation reaction by continuously running the mixing means at the rate of 3~20 rpm for preventing the channeling phenomenon of the sludge tending to flow upwards; and (iii) discharging the admixture into the aerobic reactor by using the discharging means provided in the anaerobic reactor.

* * * * *